(12) United States Patent
Harris et al.

(10) Patent No.: US 9,865,065 B2
(45) Date of Patent: Jan. 9, 2018

(54) METHOD OF AND GRAPHICS PROCESSING PIPELINE FOR GENERATING A RENDER OUTPUT USING ATTRIBUTE INFORMATION

(71) Applicant: ARM Limited, Cambridge (GB)

(72) Inventors: Peter William Harris, Cambridge (GB); Sandeep Kakarlapudi, Trondheim (NO); Andreas Due Engh-Halstvedt, Trondheim (NO)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/049,392

(22) Filed: Feb. 22, 2016

(65) Prior Publication Data

US 2016/0247249 A1 Aug. 25, 2016

(30) Foreign Application Priority Data

Feb. 25, 2015 (GB) .................................. 1503125.5

(51) Int. Cl.
G06T 1/20 (2006.01)
G06T 11/00 (2006.01)
G06T 9/00 (2006.01)
G06T 15/00 (2011.01)

(52) U.S. Cl.
CPC .............. *G06T 9/00* (2013.01); *G06T 15/005* (2013.01)

(58) Field of Classification Search
CPC combination set(s) only.
See application file for complete search history.

(56) References Cited

U.S. PATENT DOCUMENTS

| 5,867,167 A | 2/1999 | Deering |
| 5,999,189 A | 12/1999 | Kajiya |
| 6,717,578 B1* | 4/2004 | Deering ................ G06T 11/001 345/428 |
| 7,659,893 B1 | 2/2010 | Oberman |
| 7,932,914 B1* | 4/2011 | Geiss .................... G09G 5/393 345/555 |
| 2002/0050992 A1 | 5/2002 | Deering |

(Continued)

FOREIGN PATENT DOCUMENTS

| EP | 0959431 | 8/1996 |
| WO | WO 00/33183 | 6/2000 |
| WO | WO 2005/059837 | 6/2005 |

OTHER PUBLICATIONS

GB Search Report dated Aug. 1, 2016, GB Patent Application No. GB1603182.5.

(Continued)

*Primary Examiner* — Wesner Sajous
(74) *Attorney, Agent, or Firm* — Vierra Magen Marcus LLP

(57) ABSTRACT

A graphics processing pipeline includes processing circuitry. The processing circuitry is configured to determine attribute information for an object to be rendered for a set of sampling points from a compressed representation of attribute information associated with the object, when the set of sampling points is being processed by the graphics processing pipeline to generate a render output. The processing circuitry is also configured to use the determined attribute information to control the processing of the set of sampling points by the graphics processing pipeline when generating the render output.

19 Claims, 6 Drawing Sheets

(56) References Cited

U.S. PATENT DOCUMENTS

2005/0174345 A1    8/2005  Wittenbrink
2012/0293545 A1*  11/2012  Engh-Halstvedt ...... G06T 15/40
                                                        345/629
2014/0362100 A1   12/2014  Cerny
2015/0154733 A1    6/2015  Amsinck

OTHER PUBLICATIONS

GB Search Report dated Aug. 17, 2015, GB Patent Application No. GB1503125.5.
Mammen et al., "Transparency and antialiasing algorithms implemented with virtual pixel maps technique", Computer Graphics and Applications, IEEE, vol. 9, Issue 4, pp. 43-55, Jul. 1989.
Vaidyanathan et al., "Coarse Pixel Shading", High Performance Graphics 2014.
Wexter et al., "GPU-Accelerated High-Quality Hidden Surface Removal", HWWS '05 Proceedings of the ACM SIGGRAPH/EUROGRAPHICS conference on Graphics Hardware, Jul. 2005.

\* cited by examiner

METHOD OF AND GRAPHICS PROCESSING PIPELINE FOR GENERATING A RENDER OUTPUT USING ATTRIBUTE INFORMATION

BACKGROUND

The technology described herein relates to graphics processing systems.

One way to display an image, such as an icon on top of a background image, is to superimpose a small image onto a background image.

In such arrangements, the foreground image is generally rendered onto the background image using a simple primitive, e.g. a quad, with more complicated shapes and effects then being created to display the desired output, e.g., icon, e.g. by using alpha blending to mask out certain parts of the foreground primitive which are transparent or translucent. The alpha (transparency) and colour values to use for the foreground primitive are usually stored in a texture associated with the foreground image primitive, which texture is then read when rendering the foreground primitive onto the background image to generate a render output, such as a frame for display.

However, the process of retrieving and using the texture can be expensive, both in terms of memory and processing, and can consume relatively large amounts of power.

The Applicant believes therefore that there remains scope for improvements to such rendering operations.

BRIEF DESCRIPTION OF THE DRAWINGS

A number of embodiments of the technology described herein will now be described by way of example only and with reference to the accompanying drawings, in which.

DETAILED DESCRIPTION

Figure 1:
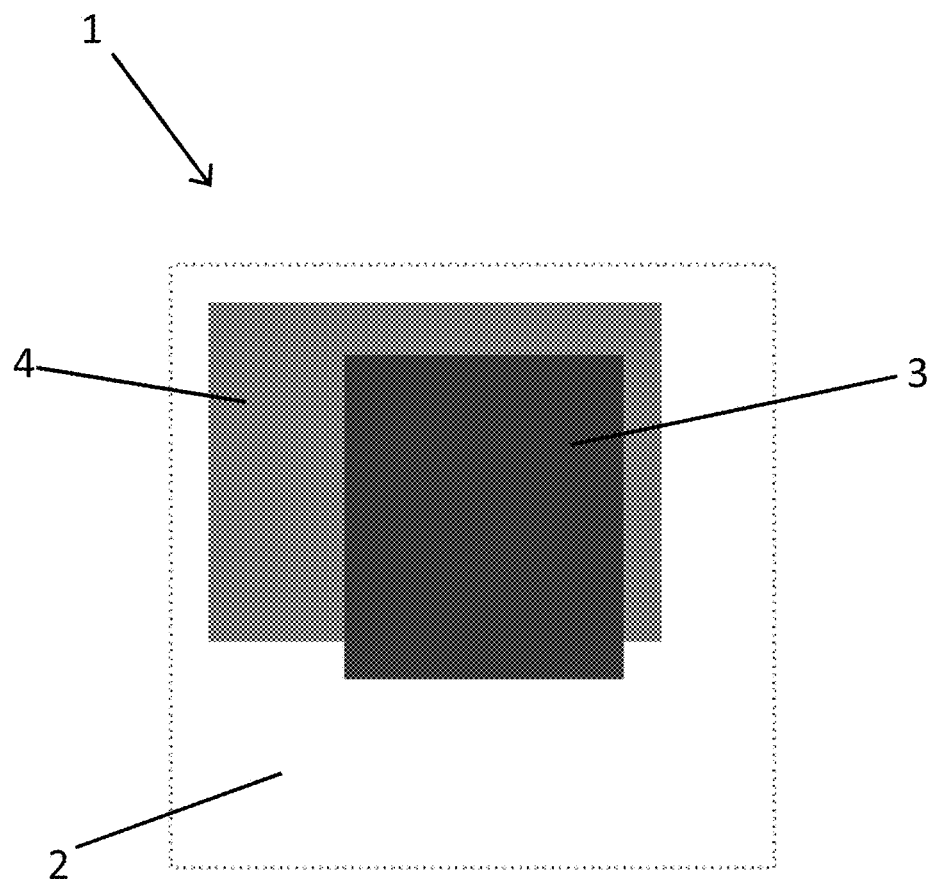
FIG. 1 shows a quad primitive with regions of different transparency for use with the technology described herein.

One embodiment of the technology described herein comprises a method of operating a graphics processing pipeline, the method comprising:

determining attribute information for an object to be rendered for a set of one or more sampling points from a compressed representation of attribute information associated with the object, when the set of one or more sampling points is being processed by the graphics processing pipeline to generate a render output; and using the determined attribute information to control the processing of the set of one or more sampling points by the graphics processing pipeline when generating the render output.

Another embodiment of the technology described herein comprises a graphics processing pipeline comprising:

processing circuitry configured to:

determine attribute information for an object to be rendered for a set of one or more sampling points from a compressed representation of attribute information associated with the object, when the set of one or more sampling points is being processed by the graphics processing pipeline to generate a render output; and use the determined attribute information to control the processing of the set of one or more sampling points by the graphics processing pipeline when generating the render output.

The technology described herein relates to a graphics processing pipeline, e.g. in a graphics processing system, in which a render output, e.g. a frame for display, is being generated. When a set of sampling points, e.g. for all or part of the frame, is being processed to generate a render output, attribute information, e.g. colour, transparency, etc., associated with an object to be rendered for the set of sampling points is determined from a compressed representation of the attribute information for the object and used to control the processing of the set of sampling points by the graphics processing pipeline when generating the render output.

As will be discussed further below, the Applicant has recognised that a compressed representation of attribute information for an object to be rendered can usefully be used to determine attribute information about the object, and, furthermore, that this can then usefully be used to control the processing in the graphics processing pipeline when generating a render output (in, e.g. contrast to simply using the determined attribute information in the processing).

For example, the attribute information could be used to determine when an object displayed in front of a background image is completely opaque, i.e. its alpha value equals 1, over at least part of its area, with processing for sampling points for the part of the background image which is covered by the opaque area then being avoided or stopped, thereby reducing unnecessary processing by the graphics processing pipeline.

Correspondingly, the attribute information could be used to determine when an object displayed in front of a background image is completely transparent, i.e. its alpha value equals 0, over at least part of its area, with the processing of the sampling points for the part of the object which is transparent then being avoided or stopped, thereby again reducing unnecessary processing by the graphics processing pipeline.

The compressed representation of the attribute information can thus be used to allow the generation of the render output to be performed more efficiently. Moreover, as a compressed representation of the attribute information is used, this can be done more efficiently, thereby, e.g., making it effective to do this in advance of, e.g., (and, e.g., to control) the reading and use of the "full", e.g. uncompressed, attribute information for the object in question.

The render output that is being generated by the graphics processing pipeline can be any suitable and desired render output that a graphics processing pipeline can generate. In one embodiment, it is a frame for display, but it could also be other forms of graphics processing output, such as a graphics texture (e.g. in a render-to-texture operation), etc. In one embodiment the output is an image.

The set of one or more sampling points that is being processed by the graphics processing pipeline to generate the render output may be any suitable and desired set of sampling points being processed by the graphics processing pipeline when generating the render output. It may contain only a single sampling point, but in one embodiment the set of sampling points contains a plurality of sampling points. In one embodiment the sampling points in the set of sampling points are grouped together, e.g. in screen space.

The set of sampling points may comprise all of the sampling points for the render output (e.g. frame) that is being generated. However, in an embodiment the set of sampling points is the set of sampling points for a given region of (i.e. for some but not all of) the render output that is being generated. In an embodiment, the set of sampling points comprises a rendering tile that is being processed by the graphics processing system in order to generate the render output (and thus in one embodiment the graphics processing pipeline is a tile-based graphics processing pipeline).

As well as the set of sampling points for a given region of the render output that is being generated, the set of sampling points that is being considered may also or instead (and, in an embodiment, also) be based on a set of sampling points for the object to be rendered (e.g. a primitive having associated with it the attribute information) and/or other objects falling at least partially within the active rendering area (e.g. other primitives) (and in an embodiment this is the case). In an embodiment, the set of sampling points may be (and whose processing is controlled in the manner of the technology described herein) those sampling points for the object (e.g. primitive) being rendered that fall within the region of the render output (e.g. tile) being processed (i.e. those constructed using a logical "AND" of these "subsets" of sampling points).

In one embodiment, before the set of sampling points has its processing controlled by the attribute information determined from the compressed representation, some of the sampling points may be discarded using, for example, depth and stencil testing of the sampling points. This may be useful when two or more subsets of sampling points are combined with, for example, some of the resultant sampling points obscuring other sampling points.

The object to be rendered for the set of sampling points can be any suitable and desired object that can be rendered by a graphics processing pipeline. In an embodiment the object comprises a primitive to be rendered, e.g. a primitive in the form of a simple polygon such as a quad, a triangle, a point or a line. The object may be at any depth, relative to other objects in the set of sampling points, but in an embodiment the object is the foremost in the set of sampling points, e.g. the foremost primitive in the plurality of primitives which fall within the set of sampling points. (This is particularly, but not exclusively, applicable when the attribute information determined from the compressed representation comprises transparency (alpha) values, because then the transparency value of the foremost object may determine how that object and the objects behind are processed.)

Furthermore, in an embodiment the object is guaranteed to exist, i.e. at least some part of the object will be displayed in the final render output. Thus any modification of the processing of the set of sampling points based on the determined attribute information of the object can be made with confidence, e.g. in this embodiment fragments will not be discarded in error.

In an embodiment the sampling points (from the set of sampling points) which fall within the object to be rendered are guaranteed to produce a render output when they pass depth and stencil testing, i.e. all parts of the object covered by these sampling points which pass depth and stencil testing are output from the rendering process and none are discarded. This helps to ensure that, for example, any objects overdrawn by the object are only discarded when the object to be rendered is emitted in the final output from the rendering process.

The object, e.g. primitive, will have associated with it attribute information that may be used, e.g., when processing the object to generate the render output. This attribute information may comprise any suitable and desired information, for example: one or more colour components (e.g. red, green, blue), alpha (transparency) values, stencil control information, lighting values, shadowing values, etc.

The attribute information may be associated with the object to be rendered in any suitable and desired manner (e.g. depending upon the object in question and the object and/or type of attribute information in question). For example, the attribute information may be stored for particular positions in the object (e.g. for the vertices of the primitive). In an embodiment, the attribute information is stored as a texture that is to be used for (and that is associated with) the object (i.e. that is to be applied to the object when it is rendered). (The texture will then, as is known in the art, store relevant attribute values for an array of sampling (data) positions (texture elements (texels)) within the texture, which can then be sampled to determine the attribute values for any given position within the object when it is rendered.)

The attribute information for which a compressed representation is provided (and which is then used to determine attribute information for the object being rendered in the manner of the technology described herein) can comprise any suitable and desired attribute information associated with the object. Thus, for example, it could, and in an embodiment does, comprise: one or more colour components, alpha (transparency) values, stencil information, lighting, shadowing, etc.

A compressed representation can be generated for all the attribute information that is associated with the object.

However, in an embodiment, the compressed representation that is used to determine the attribute information for the object to be rendered is a compressed representation of only some but not all of the attribute information associated with the object. In an embodiment it is a compressed representation of only some but not all of the different types of attribute information that is defined for the object, such as a compressed representation of the colour value or values for the object and/or of the transparency (alpha) values for the object. In an embodiment, the compressed representation of attribute information associated with the object that is used to determine the attribute information for the object is a compressed representation of the alpha (transparency) values for the object.

The compressed representation of the attribute information can take any suitable and desired form, and be generated in any suitable and desired manner, e.g. according to any suitable and desired compression scheme, and to any suitable and desired level of compression.

In one embodiment the compressed representation represents the attribute information in question at a lower precision than the original attribute information. In an embodiment the compressed representation represents each of one or more pieces of data of the attribute information with less precision than the original pieces of data. In an embodiment the compressed representation is generated by quantising the attribute information, to reduce the number of different values the attribute information can take in the compressed representation compared to the original attribute information.

Thus, in an embodiment, the one or more pieces of data forming the attribute information are each represented in fewer bits in the compressed representation compared to the original attribute information (as it is stored, e.g., in a texture). In one embodiment each piece of data in the compressed representation is representing using four bits or less, e.g. using two bits or less, e.g. using one bit values. In an embodiment each piece of data in the compressed representation is represented as a two bit value (whereas the original attribute information may, e.g., be given as 6 or 8 bit values, for example).

Storing each piece of data in the compressed representation as a two bit value is particularly suitable when the attribute information comprises one or more alpha values associated with the object, for example. This enables up to four different alpha "states" to be indicated in the compressed representation, such as (fully) opaque, (fully) transparent, or translucent (e.g., on average, i.e. at a finer resolution it may be a mixture of opaque, transparent and/or translucent regions), with the fourth state being reserved, e.g. for an error code.

Correspondingly, a single bit compressed representation could be used to indicate two different "states", for example (fully) opaque or (fully) transparent, or not (i.e. either opaque or transparent, or translucent (on average, i.e. at a finer resolution it may be a mixture of opaque, transparent and/or translucent regions)), i.e. whether the (original) alpha value was anything other than 0 or 1, or exactly 0 or 1.

This compares, for example, with the use of eight bit values (thus allowing the storage of 256 different values) that may be typically be used for storing "full" alpha values in a texture, demonstrating that a large compression ratio can be achieved from the original attribute information. However, as will be explained below, the Applicant has recognised there are a number of useful decisions relating to further processing within the graphics processing pipeline that can be taken using the compressed representation, even based on a limited number of, e.g. quantised, attribute values stored in the compressed representation.

Thus, the precision at which the compressed representation is generated may be chosen so that it depends on or corresponds to the number of decision outcomes that are involved in the control of the processing of the set of sampling points. For example, when there are only two options in the further processing of the set of sampling points, e.g. one option when the attribute information takes one value or set of values (e.g. having an alpha value exactly 0 or 1) and another option when the attribute information takes another value or set of values (e.g. having an alpha value of anything other than 0 or 1), then each piece of data in the compressed representation may be able to be stored in a single bit. When there are more decision outcomes involved in the control of the processing of the set of sampling points then the compressed representation may be generated at a higher precision and a greater number of bits may be used to store each piece of data in the compressed representation.

In addition to, or instead of, (and, e.g., in addition to) the compressed representation of the attribute information representing the data (each piece of data) with less precision than in the original attribute information, the compressed representation may be generated by representing the attribute information at a coarser resolution than the original attribute information, e.g. by reducing the spatial density of the pieces of data (the data positions) indicating the attribute information. This may be particularly appropriate where the original attribute information (e.g. alpha values) is in the form of a data array, such as a texture. Therefore, in an embodiment the compressed representation represents the attribute information with fewer pieces of data than in the original attribute information.

The Applicant has appreciated that the attribute values of a group of plural data positions (sampling points) in the "full" attribute information may often be the same or similar, e.g. over a region of the object in question. Therefore useful decisions as to the control of the processing of a set of sampling points by the graphics processing pipeline may be able to be taken without having to refer to the attribute information at its finest resolution, e.g. by sampling each of the pieces of data of the original attribute information across a region of the object. For example, when a region of an object in screen space is completely transparent, then a single decision may be able to be taken for the whole region, e.g. when the compressed representation comprises pieces of data at the resolution of the region. This can then be used to reduce the processing involved, e.g. in the rendering of that part of the object, and thus the power consumed.

(As will be appreciated from the above and below discussions, the resolution of the compressed representation does not necessarily need to match the size of the region; the compressed representation may be provided at any suitable and desired resolution. For example, multiple pieces of data at a (e.g. slightly) finer resolution than the region may be used, or the resolution of the compressed representation may even be larger than the region over which the sampling points are being processed, e.g. as long as the compressed representation covers the region in question.)

Thus in an embodiment, the compressed representation of the attribute information comprises a data array having a plurality of data positions, with each data position storing a value of the attribute in question for that data position, with each data position in the compressed representation corresponding to a plurality of data positions (attribute values) in the original, "full" attribute information for the object. Thus, where the attribute information for the object is in the form of a texture, in an embodiment the compressed representation of the attribute information comprises a data array in which each data position corresponds to a plurality of texels in the original attribute information texture. Correspondingly, in an embodiment, the compressed representation of the attribute information comprises an array of data positions, in which each data position stores a data value for a region of the object that corresponds to a plurality of data positions (sampling positions) in the original attribute information.

Thus, in an embodiment, where the "full" attribute information for the object comprises a plurality of data values (pieces of data), the compressed representation of the attribute information contains fewer data values (fewer pieces of data), e.g. with each data value (piece of data) in the compressed representation of the attribute information representing and corresponding to a set of plural data values (pieces of data) of the "full" attribute information.

In this embodiment, each piece of data in the compressed representation could have the same precision as each piece of data in the original attribute information, e.g. use the same number of bits, but in an embodiment, as outlined above, each of the one or more pieces of data in the compressed representation is represented with less precision than the pieces of data in the original attribute information.

In these embodiments, the compressed representation may be generated at any suitable and desired (lower) level of resolution, i.e. that is coarser than the resolution of the original attribute information. In an extreme example, the compressed representation may be a single piece of data representing all the attribute information associated with the object (which may comprise a large number of pieces of data). In one embodiment, the compressed representation comprises pieces of data that each correspond to a 16×16 square of sampling points (data positions) in the original attribute information.

As will be appreciated, the generation of the compressed representation at a coarser resolution results in the loss of attribute information spatially. Thus in an embodiment, two or more compressed representations at two or more different resolution levels, e.g. a coarser level and at a finer level of resolution, are generated (with it then being determined which resolution to use at any given time, as will be discussed further below). In an embodiment, e.g. when the compressed representation comprises data values at the same level of precision as the original attribute information, the finer or finest level of resolution is coarser than the level of resolution of the original attribute information. When the compressed representation comprises data values at a lower precision than the original attribute information, in an embodiment the finer or finest level of resolution is the same resolution as the level of resolution of the original attribute information.

In this embodiment the different levels of resolution at which the compressed representation is generated may be determined in any suitable and desired way. (A balance needs to be struck between the resolution at which the compressed representation may wish to be sampled (if this is too fine then this degrades the efficiency and thus the effectiveness of being able to make decisions for a region as a whole) and the accuracy of the attribute information being represented in the compressed representation (if this is too coarse then the accuracy of the decisions being made based on the compressed representation is degraded and it may be necessary to iterate to find an appropriate level of resolution at which to sample to compressed representation), as well as the overall compression ratio which is achieved by the compressed representation compared to the original attribute information. Thus, in an embodiment, there are multiple levels of resolution in the compressed representation.)

Thus, in an embodiment the compressed representation of the attribute information comprises a set of two or more representations of the attribute information in question, each storing and representing the attribute information at a lower (and different) (spatial) resolution to the original attribute information. In an embodiment, the compressed representation takes the form of a mip-map, i.e. a sequence of data arrays (e.g. textures) storing the attribute information in question at progressively decreasing levels of resolution. This allows the compressed representation to be used at a number of different resolutions such that it may be used at a suitable and desirable resolution when it is used to control the processing of a set of sampling points by the graphics processing pipeline when generating the render output, as will be explained in more detail below.

In these embodiments, the level of resolution at each e.g. level of the mip-map, may be chosen in any suitable and desirable way. In an embodiment a coarser level of the e.g. mip-map, contains a quarter of the number of pieces of data of the adjacent finer level of the, e.g. mip-map, e.g. each edge of the coarser level contains half the number of points of the corresponding edge of the finer level. Thus, in an embodiment, each piece of data in a coarser level of the, e.g. mip-map, corresponds to four pieces of data in the adjacent finer level of the, e.g. mip-map.

In an embodiment, e.g. when the compressed representation comprises data values at the same level of precision as the original attribute information, the finest (highest) resolution level of the compressed representation (e.g. mip-map) has pieces of data that each correspond to a 16×16 square of sampling points (data positions) in the original attribute information. In an embodiment each data position in the next level up in the compressed representation (e.g. mip-map) then corresponds to a 32×32 square of sampling points in the original attribute data, with this quartering of the number of pieces of data in each level up in the compressed representation (mip-map) continuing until the lowest resolution level contains only a single piece of data (data position), e.g. representing the whole of the attribute information.

When the compressed representation comprises data values at a lower precision than the original attribute information, in an embodiment the finest (highest) resolution level of the compressed representation (e.g. mip-map) has pieces of data that each correspond to a sampling point (data position) in the original attribute information, i.e. the resolution is the same. In an embodiment each data position in the next level up in the compressed representation (e.g. mip-map) then corresponds to a 2×2 square of sampling points in the original attribute data, with this quartering of the number of pieces of data in each level up in the compressed representation (mip-map) continuing until the lowest resolution level contains only a single piece of data (data position), e.g. representing the whole of the attribute information. Thus, in an embodiment, a full mip-map chain from the resolution of the original attribute information all the way down to a single data value is provided.

The pieces of data in each of the different levels of resolution at which the compressed representation is generated may be stored in any suitable and desired format, e.g. precision. In an embodiment each of the pieces of data at each of the two or more different resolutions are stored at the same level of precision, e.g. each data value is stored in the same number of bits, regardless of which level of resolution the piece of data is stored at. This allows the data to be manipulated more easily between the different levels of resolution.

In an embodiment, the highest resolution compressed representation is generated from the original attribute information, with the other lower resolution levels then being generated from their respective higher resolution level, i.e. without having to refer back to the original attribute information. (Storing all the pieces of data at the same precision can help to facilitate this.) This reduces the amount of data which has to be transferred to generate the compressed representation, e.g. the original attribute information only needs to be sampled once. In an embodiment pieces of data in a finer level of resolution of the compressed representation only contribute to one piece of data in a coarser level of resolution of the compressed representation, i.e. there is a many to one relationship between the pieces of data in a finer level of resolution and the pieces of data in a coarser level of resolution.

In order to generate the compressed representation, two or more pieces of data in a finer level of resolution may be combined into a single piece of data in the adjacent coarser level of resolution in any suitable and desired way, e.g. by taking an average (e.g. the mean) of the values of the two or more pieces of data to be combined into the single piece of data. However, in an embodiment, a bitwise OR or AND of the two or more pieces of data (depending on how the how the bits of the data are encoded) in the finer level of resolution is used to determine the value of the corresponding one piece of data in the adjacent coarser level. Thus, in an embodiment, four pieces of data in a finer level of resolution of the compressed representation are combined into one piece of data in the adjacent coarser level of resolution of the compressed representation, using a bitwise OR or AND of four pieces of data in the finer level of resolution to calculate one piece of data in the adjacent coarser level.

Using a bitwise OR or AND of the pieces of data in the different levels of resolution in the compressed representation helps to ensure that the generation of the lower resolution levels of the compressed representation is done in a "conservative" manner that may avoid, when the compressed representation is used, an incorrect decision as to how to control the processing of the graphics processing pipeline being made.

The technology described herein also extends to the generation of the compressed representation of the attribute information.

Thus, in an embodiment, the method comprises (and the processing circuitry is configured to) generating a compressed representation of attribute information associated with an object to be rendered; and storing the compressed representation along with the original attribute information for use in generating a render output by a graphics processing pipeline when rendering the object. It will thus be appreciated that in this and other embodiments, the compressed representation may be provided in addition to the original attribute information, e.g. texture.

It will thus be seen that in further embodiments the technology described herein comprises a method of operating a graphics processing system, the method comprising:

for an object to be rendered by the graphics processing system to generate a render output:
  generating a compressed representation of attribute information associated with the object to be rendered and
  storing the compressed representation along with the original attribute information for use in generating a render output by a graphics processing pipeline when rendering the object.

The technology described herein also comprises a graphics processing system comprising:

processing circuitry configured to:
  generate, for an object to be rendered by the graphics processing system to generate a render output, a compressed representation of attribute information associated with the object to be rendered; and
  store the compressed representation along with the original attribute information for use in generating a render output by a graphics processing pipeline when rendering the object.

As will be appreciated by those skilled in the art, these embodiments of the technology described herein can, and in an embodiment do, include any one or more, or all, of the optional features of the technology described herein, as appropriate.

Thus, for example, the attribute information that is compressed may, e.g., comprise transparency (alpha) values associated with the object.

The compressed representation of the attribute information, i.e. the data values thereof, may be generated from the attribute information in any suitable and desired way. Where the compressed representation is generated at a coarser resolution than the original attribute information then, as discussed above, the reduction in resolution may be performed in any suitable and desired way, e.g. by averaging or otherwise combining the data values for a corresponding set of plural data values in the original attribute information (e.g. using a bitwise OR or AND). Alternatively the original attribute information may be sampled in any suitable and desired way to determine each data value in the compressed representation.

Where the precision of the data values in the compressed representation is lower than the original attribute information, then the precision may be reduced in any suitable and desired way, e.g. by quantising the data values in the original attribute information.

In a combination of both of these embodiments, i.e. in which the precision of the data values in the compressed representation is lower than the original attribute information and the compressed representation is generated at a coarser resolution than the original attribute information, the data values may first be reduced in precision and then in resolution (or vice versa). However, in an embodiment, these two steps are performed together. In an embodiment this is achieved, for each data value in the compressed representation, by categorising a set of plural data values in the original attribute information into one of a predefined number of quantised data values in the compressed representation.

The categorising of the set of plural data values in the original attribute information into one of a predefined number of quantised data values in the compressed representation may be performed in any suitable and desired way, e.g. depending on the type of attribute information involved. Typically the quantised data values in the compressed representation will summarise the set of plural data values in the original attribute information. For example, when the attribute information comprises transparency (alpha) values, the set of plural transparency (alpha) values in the original attribute information may be categorised into three categories:

1) that the plural transparency (alpha) values in the set are all opaque (i.e. alpha=1);

2) that the plural transparency (alpha) values in the set are all transparent (i.e. alpha=0); or 3) that the plural transparency (alpha) values in the set are neither all opaque or all transparent. (This may occur either because the plural transparency (alpha) values in the set are all translucent (i.e. 0<alpha<1), but more likely because the plural transparency (alpha) values in the set are a mixture of opaque, translucent and transparent, such that at the resolution the compressed representation is being generated, the whole region corresponding to the set of plural data values is neither completely opaque nor completely transparent.)

The compressed representation of the attribute information can be generated by any suitable and desired processing circuitry within the graphics processing system, e.g. a processor of the graphics processing system. The processing circuitry may comprise one of: a CPU, a GPU, a video engine, an image processor or a processing stage of the graphics processing pipeline, etc. Although the compressed output may be generated by part of the graphics processing pipeline, e.g. while the set of sampling points is being processed and the render output is being generated, in an embodiment the processing circuitry that is configured to generate the compressed representation comprises a CPU. Thus, in an embodiment, the compressed representation is not generated by the graphics processing pipeline but by a separate part of the graphics processing system. This allows the compressed representation to be generated, e.g. offline, so that it is ready upfront for use by the graphics processing pipeline when processing the object as part of the generation of the render output.

The generation of the compressed representation by the appropriately configured processing circuitry can be implemented in hardware, e.g. one or more fixed function units, or in software, as is suitable and desired. In an embodiment the compressed representation is generated by processing circuitry programmed to operate in a desired manner. This enables the compressed representation to be generated by any suitably programmed processing circuitry.

The compressed representation, once generated, may be stored in any suitable and desired location, and on any suitable and desired storage. The compressed representation may be stored, along with the original attribute information (e.g. in the form of a texture), on a physical storage medium such as a flash memory, ROM chip, CD ROM, RAM or disk when, for example, the compressed information is generated "offline". Alternatively (or in addition when the compressed representation and the original attribute information are subsequently loaded into the graphics processing system for use in generating the render output) the compressed representation may be stored in any suitable and desired storage in the graphics processing system, e.g. memory. In an embodiment the compressed representation is stored in a buffer, e.g. alongside the original attribute information, of the graphics processing system, e.g. of the graphics processing pipeline.

Once the compressed representation has been generated from attribute information associated with an object then, when the object is to be rendered for a set of sampling points by the graphics processing pipeline to generate a render output, attribute information for the set of sampling points from the compressed representation of the attribute information can then be determined for the object to be rendered. The attribute information may be determined from the compressed representation in any suitable and desired way. In an embodiment this is done by sampling the compressed representation of the attribute information.

The compressed representation may be sampled in any suitable and desired way to determine the attribute information, for example at any suitable and desired resolution and with any number of the one or more sampling points. It will be appreciated that the choice of how many sampling points to use is a trade-off between the resolution at which the compressed representation is sampled and the accuracy of the attribute information determined from the compressed resolution (i.e. at a finer resolution with a greater number of sampling points the accuracy of the attribute information determined will be greater, but this will require more processing that may be unnecessary, e.g. when all the sampling points return the same or very similar attribute information).

As described above, in an embodiment the compressed representation is provided at a number of different resolutions, e.g. using a mip-map. In this embodiment the compressed representation may be sampled at the coarsest resolution first and then sampled at a finer resolution when the attribute information determined at the coarsest resolution is inconclusive, i.e. more detailed information is required, for example. This may be repeated at increasingly finer levels of resolution (if the compressed representation possesses them) until the attribute information has been determined from the compressed representation to the desired level of detail.

For example, when the attribute information comprises transparency (alpha) values, which are generated for the compressed representation at a number of different levels of resolution, at coarser levels of resolution, the compressed representation may indicate, at a particular sampling point, that the transparency (alpha) values of the original attribute information are either translucent or a mixture of opaque, transparent and/or translucent points, i.e. they are not all opaque or all transparent. However, by sampling the compressed representation at a finer level of resolution, at least some of this ambiguity may be able to be resolved, e.g. this may indicate that for some of the sampling points the transparency (alpha) values are completely transparent or opaque, for example, though ultimately even at the finest resolution level of the compressed representation, it may not be possible to resolve all the ambiguities. In these situations the original attribute information may then be sampled.

Thus at first, the compressed representation may only be sampled at a limited number of points, e.g. at a single point. The sampling may be performed at an appropriate level of resolution, which in an embodiment corresponds to the level of resolution at which the resolution, i.e. the area which is covered by a single data value in the compressed representation, matches the area over which the set of sampling points are defined. The compressed representation may then be sampled at additional sampling points, i.e. at a finer resolution, when further information is required, e.g. when the first sampling point(s) proves inconclusive.

It will be appreciated that, depending on the (compressed representation of the) attribute information, this may allow a simple (logic) decision to be made as to whether to investigate further or that the attribute information determined at the coarse level is sufficient for controlling the further processing in the graphics processing pipeline that is being performed, thus providing an efficient way of determining the attribute information. However, it will also be appreciated that when the compressed representation has to be sampled at multiple levels of resolutions, this may involve more processing than when the original attribute information were to be sampled. However, this may be avoided when the finest level of resolution of the compressed representation is coarser than the original attribute information, or the compressed representation is sampled at an appropriate resolution initially, e.g. depending on the size of the set of sampling points being processed.

As discussed above, the set of sampling points, e.g. comprising a rendering tile, that is being processing processed by the graphics processing pipeline may not correspond directly to the data positions in the compressed representation, i.e. which are associated with an object being rendered for the set of sampling points. Therefore when sampling the compressed representation to determine attribute information, a mapping may need to be performed between the set of sampling points and the data positions in the compressed representation.

The mapping between the set of sampling points and the data positions in the compressed representation may be performed in any suitable and desired way. In an embodiment a bounding box is used, i.e. the method comprises the steps of (and the processing circuitry is configured to) defining a bounding box surrounding the set of one or more sampling points, mapping the bounding box to the compressed representation, and sampling the compressed representation within the bounding box to determine attribute information.

The set of sampling points and the object (and therefore the data positions in the compressed representation) may be defined in different coordinate systems. For example, the set of sampling points may be defined in screen space and the object may be defined in a user-defined space. These different coordinate systems may not be aligned with each other and so a bounding box defined for the set of sampling points may not align with the array of data positions in the compressed representation, and may thus require further processing, e.g. transformation of coordinate systems, to map the bounding box onto the array of data positions in the compressed representation. Thus in an embodiment the step of mapping the bounding box (surrounding the set of one or more sampling points, which in an embodiment has been defined in the coordinate system of the set of one or more sampling points) to the compressed representation comprises defining a (further) bounding box in the coordinate system of the compressed representation surrounding the bounding box for the set of one or more sampling points, and sampling the compressed representation within the further bounding box to determine attribute information. By defining a bounding box in the coordinate system of the compressed representation, surrounding the bounding box for the set of sampling points, the compressed representation is sampled easily and it helps to ensure that attribute information will not be missed. In an embodiment the bounding box in the coordinate system of the compressed representation is defined to surround the bounding box for the set of sampling points in such a way that it is guaranteed that attribute information sampled from the compressed representation will not be missed.

The Applicants have appreciated that the use of a bounding box, defined e.g. by determining the corners of the bounding box, (in whatever coordinate system) to sample the compressed representation is particularly convenient in the embodiments in which the compressed representation comprises data values at two or more levels of resolution. In an embodiment the compressed representation is sampled at a level of resolution that is based on the size of the bounding box, e.g. at the level of resolution at which the resolution, i.e. the area which is covered by a single data value in the compressed representation, matches the size of the bounding box. The compressed representation may then be sampled at additional sampling points, i.e. at a finer resolution within the bounding box, when further information is required, e.g. when the first sampling point proves inconclusive.

For example when a bounding box is defined for the set of sampling points and the compressed representation comprises a mip-map, in an embodiment the level of the mip-map having a resolution which is the same or a similar size to the size of the bounding box is sampled to determine the attribute information, e.g. the coarsest resolution mip-map level where all four corners of the bounding box return the same or neighbouring sampling points.

If more than one value for the attribute information is determined from the compressed representation, e.g. different values from a bounding box (such as at the four corners), in an embodiment the plural values of the determined attribute information are combined into a single value. This allows for simple control of the processing of the set of sampling points, as it only depends on a single value of the determined attribute information.

The plural values of the determined attribute information may be combined into a single value in any suitable and desired way. For example, the plural values could be combined using a logical, e.g. bitwise, AND or OR, or using floating point filtering, e.g. as normally used for texturing. In this latter example, the filtered value is, in an embodiment, set to 0.0 when no bits are set in the sampled values from the compressed representation, to 1.0 when all the bits set, and to an intermediate value when only some of the bits are set.

Once the attribute information has been determined for the set of sampling points it may be stored in a storage, e.g. a cache, both for the attribute information to be used in the control of the processing of the set of sampling points and/or for the subsequent control of the processing of the or another set of sampling points. In an embodiment the sampled attribute information is retained, e.g. cached, for future use so that when the same attribute information is required in future, it can (potentially) be determined simply by fetching the information from the storage (e.g. cache), rather than having to sample the compressed representation again.

The control of the processing of the set of sampling points using the attribute information determined from the compressed representation of the attribute information may be performed in any suitable and desired way, which may depend on the type of attribute information that has been determined. In an embodiment the processing of the set of sampling points (e.g. for the tile and/or the object being rendered) is modified depending on the value(s) of the determined attribute information. Thus the processing (e.g. the operation of the processing and/or the processing that the set of sampling points is subjected to) is controlled depending on the value of the determined attribute information.

(It should be noted here that the compressed attribute information is used in the technology described herein to control the processing of the set of sampling points, e.g., to modify the processing (e.g. rendering) configuration for the set of sampling points to something other than the application set (asked for), rather than, e.g., the compressed attribute information simply being used as an (input) value, e.g. a variable, in a processing operation to provide a given output (result) value.)

The control or modification of the processing of the set of sampling points may be to do one or more, or all, of: omit or disable a step in the processing, enable or activate a step (or a further process) in the processing, only process a subset of the sampling points in the set (e.g. relating to a certain region), increase the sampling points in the set being processed (e.g. relating to a larger region and/or at a finer resolution), terminate the processing of one or more of the sampling points, and modify a step in the processing, e.g. perform a process differently and/or at a different point in the graphics processing pipeline.

In one embodiment the processing of the set of sampling points is controlled, using the determined attribute information, by determining (selecting) one or more processing steps to be performed for the set of sampling points. Thus in an embodiment the method (i.e. the step of using the determined attribute information to control the processing) comprises (and the processing circuitry is configured to): using the determined attribute information to determine (select) one or more processing steps (e.g. one or more processing tasks) to be performed for the set of sampling points in the graphics processing pipeline when generating the render output (and in an embodiment then performing the determined one or more processing steps for the set of sampling points). Thus the determined attribute information is potentially used to alter the way in which the sampling points are processed, e.g. to select different processing steps in the processing of the sampling points from how it would normally be performed.

In an embodiment the determined attribute information is used to control the processing of a set of sampling points by choosing between a number of variants in the processing of the set of sampling points, e.g. a small or fixed number of variants, that may correspond to the one or more processing steps determined using the determined attribute information, as described above. Each variant (or processing step) may correspond to performing a (respective) different set of processing tasks for the set of sampling points, and may, e.g., be defined by respective different (e.g. predefined)

shaders (shader programs), draw calls (which may execute one or more shaders) and/or render states (e.g. depth or stencil configuration and/or blending state) to be executed for the set of sampling points.

For example there may be two options in the processing of the set of sampling points, and the determined attribute information is used to choose between them, e.g. depending on the value(s) of the attribute information. One of the variants or options may be to do nothing, e.g. to carry on with the processing of the set of sampling points as if the compressed representation of the attribute information had not been used. Thus in an embodiment, when the determined attribute information comprises a first value or set of values a first variant in the processing of the set of sampling points is performed and when the determined attribute information comprises a second value or set of values a second variant in the processing of the set of sampling points is performed.

The number of variants in the processing of the set of sampling points may be any suitable or desired number. As discussed above, the compressed representation of the attribute information may be generated in the form of a set of quantised values. Thus in an embodiment the number of variants in the processing of the set of sampling points is less than or equal (and in an embodiment equal) to the number of quantised values available to the compressed representation of the attribute information. For example, when the compressed representation of the attribute information is stored in a single bit of information, e.g. two quantised values are available, there may be two variants in the processing of the set of sampling points to choose between, with one variant being chosen when the attribute information is one of the quantised values and the other variant being chosen when the attribute information is the other quantised value.

The variants in the processing of the set of sampling points may be implemented in any suitable and desired way. The variants may be hardwired into logic in the hardware, e.g. in the processing circuitry of the graphics processing pipeline, e.g. in a particular processing stage. However, in an embodiment the variants are defined as respective different (e.g. predefined) shaders (shader programs), draw calls and/or render states (e.g. depth or stencil configuration and/or blending state), e.g. which perform a (respective) different set of processing tasks for the set of sampling points. Thus in an embodiment each variant is represented by a set of (e.g. predefined) processing tasks which are executed when the variant is selected, based on the attribute information determined from the compressed representation. This helps to avoid lots of specialised logic in the hardware and is easily reconfigurable.

The processing of the set of one or more sampling points that is controlled using the determined attribute information may be at and for any suitable and desired part of the graphics processing pipeline, e.g. at and for any suitable and desired processing stage of the graphics processing pipeline, i.e. any suitable and desired processing in the graphics processing pipeline may be controlled by the determined attribute information. Furthermore, the processing may be being performed on any object that is associated with the set of sampling points, e.g. the object having associated with it attribute information and/or another object (e.g. primitive or primitives) that is being processed for the set of sampling points, when generating the render output.

For example, in the embodiment in which the set of sampling points corresponds to a tile being rendered, the processing may be being performed on an object which at least partly falls within the tile (and thus the set of sampling points for which the processing is controlled should, and in an embodiment does, comprise the sampling points in the tile that the object covers). Thus in one embodiment the object having associated with it attribute information may have attribute information determined (for the set of sampling points) from the compressed representation and then the same object's processing is controlled using the determined attribute information. Therefore the control of the processing of the object using the determined attribute information may take place at the same part, e.g. processing stage, of the graphics processing pipeline as the part at which the attribute information is determined from the compressed representation.

In another embodiment, the object having its processing controlled by the determined attribute information may be a different object from the object that the attribute information relates to (though both of these objects have an association with the set of sampling points, e.g. they may at least partly fall within the same tile being rendered). For example, the object having related to it attribute information may be a primitive (e.g. in a tile) which falls in front of another primitive (i.e. the object having its processing controlled), e.g. in the same tile. Thus the attribute information may be determined at one part, e.g. processing stage, of the graphics processing pipeline, e.g. at which the object having associated with it attribute information is being processed, but a different part, e.g. processing stage, of the graphics processing pipeline may be controlled using the determined attribute information.

The determined attribute information may be used in any suitable and desired way to control the processing of the set of one or more sampling points by the graphics processing pipeline when generating the render output, e.g. depending on the type of attribute information that has been determined. The processing controlled using the determined attribute information may be one or more of: alpha-blending, the termination of processing for an object (e.g. downstream in the graphics processing pipeline), depth and/or stencil testing, lighting and shadowing, and colour processing.

As discussed above, in an embodiment the determined attribute information comprises transparency (alpha) values. Thus in an embodiment the processing is controlled depending on the determined transparency (alpha) value(s). For example, when a region (or all of) of an object is determined to be completely transparent (i.e. having an alpha value of 0) from the compressed attribute information, then that region of the object does not need to be processed and it can be discarded. Thus, in an embodiment, when the determined attribute information indicates that a region of the object to be rendered is (completely) transparent, that region of the object is not processed (further) for the set of one or more sampling points (e.g. tile in question) when generating the render object.

If a region of an object, e.g. covered by one or more sampling points, is determined to be completely opaque (i.e. having an alpha value of 1) from the compressed attribute information, then any other objects (e.g. primitives) behind the opaque region of the object do not need to be processed and can be discarded. Thus, in an embodiment, when the determined attribute information indicates that a region of the object to be rendered is (completely) opaque, any (regions of) objects which lie behind that region of the object (e.g. in screen space) are not processed (further) for the set of one or more sampling points (e.g. tile in question) when generating the render object.

The (parts of one or more) other objects behind the opaque region of the object may already be being processed in the graphics processing pipeline. Therefore in an embodiment the control of the processing of the set of sampling points comprises terminating the processing of the parts of the one or more other objects which are covered by the opaque region of the object, e.g. in screen space. In order to do this, in an embodiment a control signal is sent to the part(s) of the graphics processing pipeline, e.g. processing stage(s), where the one or more other objects which are covered by the opaque region of the object are being processed. This may be implemented in a manner similar to the Applicant's scheme as described in GB-A-2511177 which "kills" fragments and/or sampling points that are already being processed in the graphics processing pipeline.

If a region of an object, e.g. covered by one or more sampling points, is determined to be translucent (i.e. having an alpha value between 0 and 1) from the compressed attribute information, then it can (and should) be alpha blended with any other objects (e.g. primitives) behind the translucent region of the object. Thus, in an embodiment, when the when the determined attribute information indicates that a region of the object to be rendered is translucent, that region of the object is alpha blended with any (regions of) objects which lie behind that region of the object (e.g. in screen space) and which are visible (e.g. in screen space) through that region of the object.

The Applicant envisages that other modifications to the processing of the set of sampling points may be made, depending on the determined attribute information. For example, a threshold for the transparency (alpha) value may be set and further processing may be enabled (or disabled) when the determined transparency (alpha) value exceeds (or does not exceed) the threshold. Further processing may include one or more of: (early) depth testing, moving late depth and stencil testing to early depth and stencil testing, early depth writing, e.g. when multiple objects for one or more sampling points are kept in the graphics processing pipeline, not spawning new threads, e.g. when multiple objects for one or more sampling points are discarded from the graphics processing pipeline, and using alternative processing (e.g. a different (faster) shader) for the set of sampling points, e.g. using a limited number of (quantised) alpha values.

The determination of the attribute information from the compressed representation and the subsequent control of the processing using the determined attribute information may be implemented in the graphics processing pipeline and/or system in any suitable and desired way. The Applicants have envisaged two embodiments of how this may be implemented.

In a first embodiment, the determining of the attribute information from the compressed representation is performed by issuing "scout" tasks (e.g. "scout" primitives and/or threads) to the graphics processing pipeline that are operable to sample the compressed representation to determine the attribute information. In an embodiment these "scout" primitives and/or threads have the processing that they are to perform, e.g. to determine the area over which the compressed representation is to be sampled, e.g. over a tile or an object, to determine which level of resolution of the compressed representation to sample, e.g. which level of the mip map, and to return the determined attribute information, e.g. back to the GPU fragment front end, associated with them, in an embodiment in the form of a shader (a shader program) that is to be executed for the "scout" primitive(s) and/or thread(s).

In one embodiment, the "scout" primitives and/or threads are processed in advance of other (e.g. normal) processing for the set of sampling points. In another embodiment, the processing of the "scout" primitive(s) and/or thread(s) runs in parallel with other (e.g. normal) processing for the set of sampling points. Therefore a scout primitive, etc. may enable decisions downstream in the graphics processing pipeline to be taken based on the determined attribute information. For example, when an object is being processed by the graphics processing pipeline and it is determined to be opaque, it may be determined, for other objects which the opaque object overlaps, if those other objects can have their processing terminated as they will not be visible in the final output frame.

Thus in an embodiment, the step of determining the attribute information for an object may be performed in advance or in parallel with other (e.g. normal) processing for the set of sampling points.

In a second embodiment, a fixed function hardware unit is used to determine the attribute information from the compressed representation. Thus, in an embodiment, the graphics processing pipeline comprises a fixed function hardware unit for this purpose, e.g. added to the GPU fragment front end. In this embodiment, the fixed function hardware unit will determine the attribute information from the compressed representation, e.g. in the manner of one of the above described embodiments, and then use the determined attribute information to control the processing of the set of sampling points by the graphics processing pipeline, e.g. in the manner of one of the above described embodiments. This may be less flexible than the embodiment above using "scout" primitives, etc., however it may be easier to implement in a graphics processing pipeline.

Once the attribute information has been determined from the compressed representation, the processing of the set of sampling points can be controlled based on the determined attribute information in any suitable and desired way, e.g. as described above. This may involve using the determined attribute information to choose between two or more variants, e.g. hardware to use or processing tasks to execute, in the processing of the set of sampling points, with the chosen variant then being performed by the graphics processing pipeline.

In one embodiment the control of the processing comprises choosing between different draw calls to execute for the set of sampling points, the choice depending on the determined attribute information, i.e. the two or more variants may comprise two or more draw calls. Then the chosen draw call, comprising a set of processing tasks, is processed by the graphics processing pipeline, e.g. by submitting the processing tasks to the graphics processing pipeline.

In another embodiment the control of the processing comprises enabling and/or disabling one or more processing stages, e.g. shader stages, in the graphics processing pipeline, with the processing stages being enabled and/or disabled depending on the determined attribute information. Then the enabled processing stages (and/or any processing stages which have not been disabled, i.e. ones which would have otherwise been performed as part of the normal processing) are used to process the set of sampling points.

While the process of the technology described herein could be used by for all suitable cases of processing that contribute to the generation of a render output, the Applicants have recognised that in some circumstances this may not be suitable or desirable. For example, there may be little benefit in controlling the processing of a set of sampling points using attribute information determined from a compressed representation when the processing load on the graphics processing pipeline is low, e.g. because there may be sufficient capacity to sample and process the original attribute information, or when the processing load on the graphics processing pipeline is too high for there to be sufficient capacity to perform (efficiently) the steps of the technology described herein in addition to the existing processing.

Thus the system is arranged such that the technology described herein can be selectively enabled and disabled. In an embodiment the technology described herein is selectively enabled or disabled when one or more particular, e.g. predefined, criteria are satisfied. The criteria may comprise a threshold, e.g. related to the processing load on the graphics processing pipeline, and thus the method may be selectively enabled or disabled when the threshold is exceeded or fallen short of.

In an embodiment, the criteria that are used to determine when the processing of a set of sampling points is controlled using attribute information determined from a compressed representation of the attribute information comprise one or more of: when the object that the attribute information relates to is greater than a certain size; when the set of sampling points is greater than a certain size; when a certain type of processing, e.g. alpha-blending, needs to be performed; and when a certain type of attribute information, e.g. transparency (alpha) values, is available in a compressed representation.

Instead of, or as well as, selectively enabling or disabling the operation in the manner of the technology described herein, the priority of the operation to determine the attribute information and control the processing of the set of sampling points, e.g. the priority of the "scout" primitive(s), etc., may be modified, e.g. depending on the processing capacity and load of the graphics processing pipeline.

The enabling or disabling of the operation in the manner of the technology described herein may also depend on the latency of the operation to determine the attribute information, e.g. of the "scout" primitive(s). For example, when the step of determining the attribute information from the compressed representation is taking too long, e.g. greater than a particular, e.g. predefined, period of time, then the processing of the set of sampling points is, in an embodiment, proceeded with without being controlled using determined attribute information. In this embodiment the step of determining the attribute information may be terminated, or if not and the determined attribute information is subsequently returned, subsequent processing (if appropriate) for the set of sampling points may be controlled using the determined attribute information (once it is available).

The processing circuitry of the graphics processing pipeline and/or the graphics processing system that operates in the manner of the technology described herein may be implemented in any desired and suitable way, e.g. by one or more fixed-function units (hardware), or some or all of the functional units may be programmable (e.g. comprise programmable circuitry that can be programmed to perform the desired operation). In an embodiment the graphics processing pipeline comprises one or more, e.g. a plurality of, processing stages, e.g. which work together to implement the operation of the technology described herein (and comprise the processing circuitry).

In an embodiment the processing stage or stages for the implementation of the technology described herein, and therefore also the processing circuitry, comprises a shader or shaders (i.e. a programmable processing stage or stages of the graphics processing pipeline which executes a shader program, e.g. to calculate a particular rendering effect in the rendering process such as vertex and/or fragment "shading" operations).

Subject to any hardware necessary to carry out the specific functions discussed above, the graphics processing pipeline can otherwise include any one or more or all of the usual functional units, etc., that graphics processing pipelines and processors include.

Thus, the graphics processing pipeline may also contain any other suitable and desired processing stages that a graphics processing pipeline may contain. In an embodiment, it includes, e.g. in this order, one or more of, e.g. all of: a vertex shader, a rasteriser and a renderer (e.g. in the form of a fragment shader, and one or more tile buffers (in the case of tile-based rendering pipeline).

Each processing stage may be comprise a separate circuit element to other stages of the processing pipeline, or they may be at least partially formed of shared processing circuitry.

In an embodiment he graphics processing pipeline also comprises, and/or is in communication with, one or more memories and/or memory devices that store the data described herein, and/or that store software for performing the processes described herein. The graphics processing pipeline may also be in communication with a host microprocessor, and/or with a display for displaying images based on the data generated by the graphics processing pipeline.

The technology described herein is applicable to any form or configuration of graphics processing pipeline and to all forms of rendering, such as immediate mode rendering, deferred mode rendering, tile-based rendering, etc. It is particularly applicable to graphics renderers that use deferred mode rendering and in particular to tile-based renderers.

Thus, in an embodiment graphics processing pipeline is a tile-based rendering pipeline. Thus, in an embodiment, the pipeline generates rendered fragment data in respect of (for) one or more individual tiles making up the overall output of the graphics processing operation (e.g. frame to be displayed).

Although the operation of the technology described herein has been described above with particular reference to the processing of a given set of sampling points (e.g. tile) of the render output, the processing can be performed for plural (e.g. for each) set of sampling points (e.g. tile) that the render output is divided into (or at least for each set of sampling points that the object in question could, at least partially, cover (fall within)). Similarly, the operation may be performed for a single object or for plural objects for a given render output, as desired and appropriate. In an embodiment it is also repeated for successive render outputs being generated, such as a sequence of frames being displayed.

In an embodiment, the various functions of the technology described herein are carried out on a single graphics processing platform that generates and outputs the rendered fragment data that is, e.g., written to a frame buffer for a display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired.

Thus, for example, the various functional elements of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor.

It will also be appreciated by those skilled in the art that all of the described embodiments of the technology described herein can, include, as appropriate, any one or more or all of the optional features described herein.

The methods of the technology described herein may be implemented at least partially using software, e.g. computer programs. It will thus be seen that in further embodiments the technology described herein comprises computer software specifically adapted to carry out the methods herein described when installed on a data processor, a computer program element comprising computer software code portions for performing the methods herein described when the program element is run on data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising data processor causes in conjunction with said data processor said processor, renderer or system to carry out the steps of the methods of the technology described herein. Such a computer software carrier could be a physical storage medium such as a flash memory, ROM chip, CD ROM, RAM or disk, or could be a signal such as an electronic signal over wires, an optical signal or a radio signal such as to a satellite or the like.

It will further be appreciated that not all steps of the methods of the technology described herein need be carried out by computer software and thus in a further embodiment the technology described herein comprises computer software and such software installed on a computer software carrier for carrying out at least one of the steps of the methods set out herein.

The technology described herein may be embodied as a computer program product for use with a computer system. Such an implementation may comprise a series of computer readable instructions either fixed on a tangible, non-transitory medium, such as a computer readable medium, for example, diskette, CD-ROM, ROM, flash memory, RAM, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of the processing of computer graphics for display. The present embodiment is particularly concerned with the display of foreground images with complex transparencies, e.g. as shown in FIG. 1, onto a background image.

As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.

One way to display an image, such as an icon on top of a background image, is to superimpose a small image, e.g. of an icon, onto a background image, e.g. using a "blit" operation.

In such arrangements, the foreground image is generally rendered onto the background image using a simple primitive, e.g. a quad, with more complicated shapes and effects then being created to display the desired, e.g., icon by using alpha blending to mask out certain parts of the foreground primitive which are transparent or translucent, for example.

FIG. 1 shows a quad primitive 1, e.g. for use as an icon, to be rendered as a foreground image onto a background image in an embodiment of the technology described herein, with some areas 2 of the quad being transparent, some areas 3 being opaque and some areas 4 being translucent.

The transparency (alpha) values to use in an embodiment of the technology described herein for the quad primitive 1 shown in FIG. 1 are stored in a texture, which is then read when rendering the quad primitive 1 onto a background image to generate a render output, such as a frame for display. The texture stores the transparency (alpha) values for an array of sampling (data) positions (texture elements (texels)) within the texture, which can then be sampled to determine the transparency values for any given position within the object when it is rendered.

In an embodiment of the technology described herein, in order to use the transparency (alpha) values associated with the quad primitive 1 to control the processing of a set of sampling points when producing a render output, a compressed representation of the transparency (alpha) values is created and stored in association with the texture, e.g. in a buffer.

The production of the compressed representation from the original texture may be performed, e.g., offline using a CPU and will now be described with reference to FIGS. 2a and 2b.

Figure 2A:
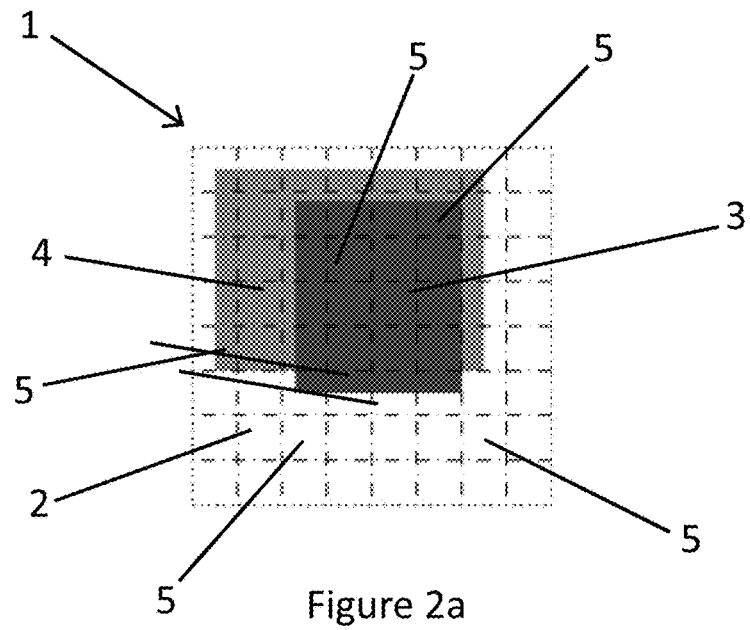
FIGS. 2*a* and 2*b* show an example of a compressed representation of a texture associated with the quad primitive shown in FIG. 1 for use with the technology described herein.
Figure 2B:
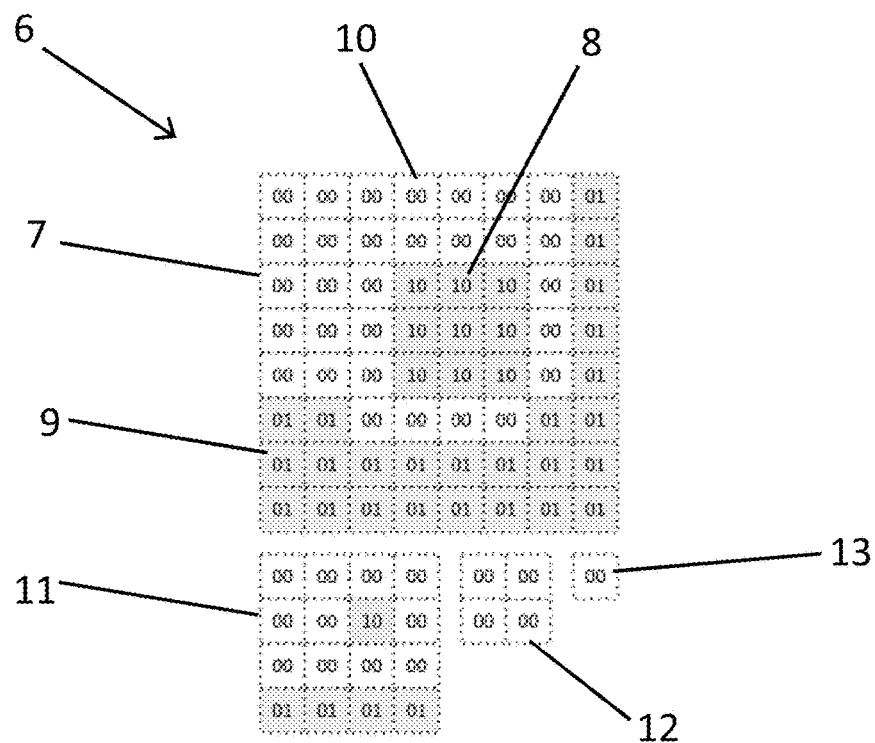

FIG. 2a shows the quad primitive 1 and its areas 2, 3, 4 of different transparency (alpha) values, with the quad primitive 1 (and therefore its associated texture containing the transparency (alpha) values) being notionally split up into squares 5 each of 16×16 texels. As can be seen in FIG. 2b, which shows the compressed representation generated as a mip-map 6, each of the 16×16 texel squares 5 in the texture is represented as a single value in the highest (finest)

resolution level 7 of the mip-map 6. Splitting the texture up into texel blocks, each containing 256 texels of the original texture, but which are represented by a single value in the highest (finest) resolution level 7 of the mip-map 6, achieves a first reduction in data size of the original texture.

In order to achieve a further reduction in the data size, the transparency (alpha) values stored in the mip-map 6 are quantised into 2-bit values. First the quantised values are determined for the highest (finest) resolution level 7 of the mip-map 6 by assessing the transparency (alpha) values for each square 5 of the texture in turn. When the transparency (alpha) values for a square 5 of the texture are all zero (indicating full transparency), the value "01" is generated for the corresponding value in the compressed representation. When the transparency (alpha) values for a square of the texture are all one (indicating full transparency), the value "10" is generated for the corresponding value in the compressed representation. When the transparency (alpha) values for a square of the texture have an average value between zero and one (i.e. this may be that they are all translucent or a mixture of opaque, transparent and/or translucent values), the value "00" is generated for the corresponding value in the compressed representation. (The value 11 is reserved as an error code.)

This determination of the quantised values for the highest (finest) resolution level 7 of the mip-map 6 for the quad primitive 1 produces one area 8 of "10" values (whole squares 5 of the quad primitive 1 that are fully opaque), one area 9 of "01" values (whole squares 5 of the quad primitive 1 that are fully transparent) and one area 10 of "00" values (whole squares 5 of the quad primitive 1 that are neither fully opaque or fully transparent (as can be seen from FIG. 2a, these squares 5 are either translucent, or a mixture of two of opaque, transparent and translucent)).

The lower (coarser) resolution levels 11, 12, 13 of the mip-map 6 are generated, for each quantised value in the mip-map level 11, 12, 13, by performing a bitwise AND of the four corresponding values in the respective higher level 7, 11, 12 of the mip-map 6. For the second highest (finest) resolution level 11 of the mip-map 6, this produces one "10" value 14 (which corresponds to four "10" values in the highest (finest) resolution level 7 of the mip-map 6), one area 15 of "01" values (with the corresponding values in the highest (finest) resolution level 7 of the mip-map 6 all being "01") and one area 16 of "00" values (corresponding to values which are either all "00" in the highest (finest) resolution level 7 of the mip-map 6 or a mixture of "00", "01" and "10").

For the lower (coarser) resolution levels 12, 13 of the mip-map 6 the values are all "00", as is deduced from the higher levels using a bitwise AND.

The compressed representation of the texture containing the transparency (alpha) values, i.e. the mip-map 6, can now be used in the processing of a set of sampling points in the generation of the render output.

Figure 3:
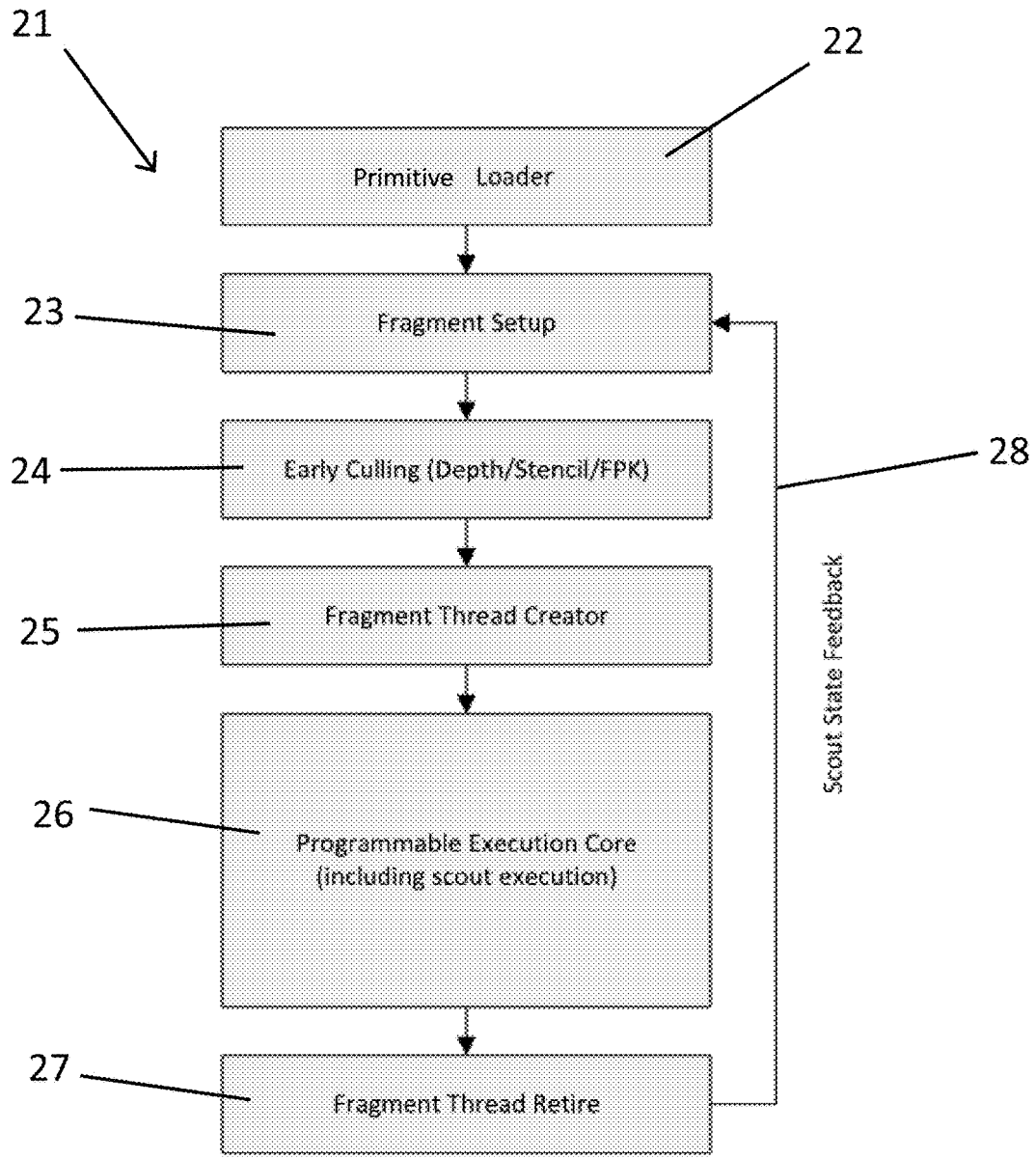
FIG. 3 shows a schematic of a graphics processing pipeline in an embodiment of the technology described herein.

FIG. 3 shows schematically the main elements of the graphics processing pipeline that are relevant to the operation of the technology described herein, i.e. to process a set of sampling points as part of the generation of a render output, e.g. a frame to be displayed.

As will be appreciated by those skilled in the art there may be other elements of the graphics processing pipeline and system that are not illustrated in FIG. 3. It should be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processor as shown in FIG. 3 may be implemented as desired and will accordingly comprise, e.g., appropriate circuitry and/or processing logic, etc., for performing the necessary operation and functions.

FIG. 3 shows, schematically, a graphics processing pipeline 21, which comprises part of a graphics processing system for rendering graphics images for display, i.e. after the graphics primitives (e.g. the quad primitive 1 shown in FIG. 1) for input to the rasterisation process have been generated. The pipeline 21 comprises a sequence of different processing stages, which each perform a different operation on the primitives making up the object to be displayed to prepare them for the final display.

First in the graphics processing pipeline 21 is a primitive loader 22 which loads primitives, e.g. triangles and quads, into the graphics processing pipeline 21. This is followed by a fragment setup stage 23 which rasterises the primitives into graphics fragments for graphics rendering in turn. The fragment setup stage 23 operates, as is known in the art, to rasterise the primitives making up the render output (e.g. the image to be displayed) into individual graphics fragments for processing. To do this, the fragment setup stage 23 receives graphics primitives for rendering, rasterises the primitives to sampling points and generates graphics fragments having appropriate positions (representing appropriate sampling positions) for rendering the primitives.

After the fragment setup stage 23 in the graphics processing pipeline 21 is an early culling stage 24 in which fragments or groups of fragments are discarded when it is determined that they will not contribute to the final display output, e.g. because they are covered by an opaque object in screen space, as will be described in more detail below.

Next in the graphics processing pipeline 21 is a fragment thread creator 25 which, based on the fragments passing through the graphics processing pipeline 21, generates processing threads to determine how the fragments passing through the graphics processing pipeline 21 should be processed, again as will be described in more detail below.

The fragment processing threads are passed to a fragment shader in the form of a programmable execution core 26 which executes one or more shader programs to process the fragment processing threads.

Following the programmable execution core 26 is a fragment thread retire stage 27 that handles the output of the fragment threads when their processing completes. The output of the fragment threads, i.e. the rendered fragments, are passed from the fragment thread retire stage 27 to a frame buffer. (If the render output is being rendered as a number of tiles individually which are then combined into the final render output, the rendered fragments for each tile are passed to a tile buffer before being sent to a frame buffer.) The rendered fragments for the frame are then read, e.g. by a display controller, from the frame buffer, e.g. for display.

The fragment thread retire stage 27 also, as shown in FIG. 3, returns the output of "scout" processing threads via a feedback loop 28 to the fragment setup stage 23. This will be discussed in more detail below.

The function of each of the processing stages in FIG. 3 in the present embodiment will be described in more detail below, with reference to FIG. 4 which shows a flow chart detailing the main operational steps of a graphics processing pipeline in an embodiment of the technology described herein. First the operation will be described with reference to the (normal) processing of a set of sampling points by the graphics processing pipeline. It will then be described how the compressed representation of the alpha value information, e.g. as shown in FIG. 2, is sampled and used to modify the processing of the set of sampling points.

When the graphics processing pipeline 21 is to produce a desired output, such as a frame to be displayed, the required graphics processing output (e.g. frame) will, as is known in the art, be processed as one or more "draw calls". Each draw call will include one or more graphics objects (e.g. including the quad primitive 1 shown in FIG. 1) to be processed. FIG. 4 shows the sequence of operations for a given draw call for a graphics processing output (e.g. frame to be displayed). The sequence of operations may be performed for the whole frame at once or for individual tiles, e.g. 16×16 pixel blocks. When the frame is rendered as a series of tiles, the sequence of operations is repeated for each tile, with the tiles then being combined, e.g. in a frame buffer, to form the output frame.

First, the graphics primitives, e.g. triangles and quads, for input to the rasterisation process are generated, e.g. by a CPU of the graphics processing system. These primitives are input via the primitive loader 22 into the graphics processing pipeline 21. The primitives are then rasterised by the fragment setup stage 23 into graphics fragments for graphics rendering in turn. To do this, the fragment setup stage 23 receives graphics primitives for rendering, rasterises the primitives to sampling points and generates graphics fragments having appropriate positions (representing appropriate sampling positions) for rendering the primitives.

The fragments are then passed to the early culling stage 24 which, when it has the relevant information available at this stage of the processing, discards any fragments or groups of fragments that are not going to contribute to the final display output, e.g. because they are covered by an opaque object in screen space, they are back-facing, they are blanked out by a stencil, etc. The remaining fragments pass to the fragment thread creator 25, which generates processing threads for the fragments to be processed by the execution core 26.

Thus the fragments associated with the set of sampling points, e.g. for the tile, being processed that have not been discarded, are issued to the execution core 26 which performs the desired shading, e.g. colouring, of the fragments. Once this shading of the fragments has been performed by the execution core 26, the processed fragments can then be sent, by the fragment thread retire stage 27, to a tile buffer for assembly into the final frame buffer output.

In the present embodiment, the above operation is modified for certain objects to be rendered when rendering a given set of sampling points of the output frame (e.g. a given tile of the render output) by using a compressed representation of the alpha values associated with the object in question to control the processing of the set of sampling points (e.g. tile) of the render output in question.

This operation will now be described with reference to the flow chart of FIG. 4.

In this arrangement, the graphics processing pipeline is configured to recognise when an object (e.g. the quad primitive 1 shown in FIG. 1) that has an associated compressed representation of its alpha values is to be rendered. In the present embodiment this is indicated in in the descriptors which set up the draw call in question. The descriptors also indicate the location of the shader program for the scout threads.

In this event, in advance of the (normal) processing of the object in relation to the set of sampling points (e.g. tile) in question, one or more "scout" threads are generated to sample the compressed representation of the alpha values for the object in question, and this is then used to (potentially) modify the processing of fragments for the object for the set of sampling points (whether relating to the object itself or to other objects that are being rendered for the set of sampling points (e.g. tile) in question).

This operation in an embodiment of the technology described herein will now be described with reference to the flow chart of FIG. 4.

Figure 4:
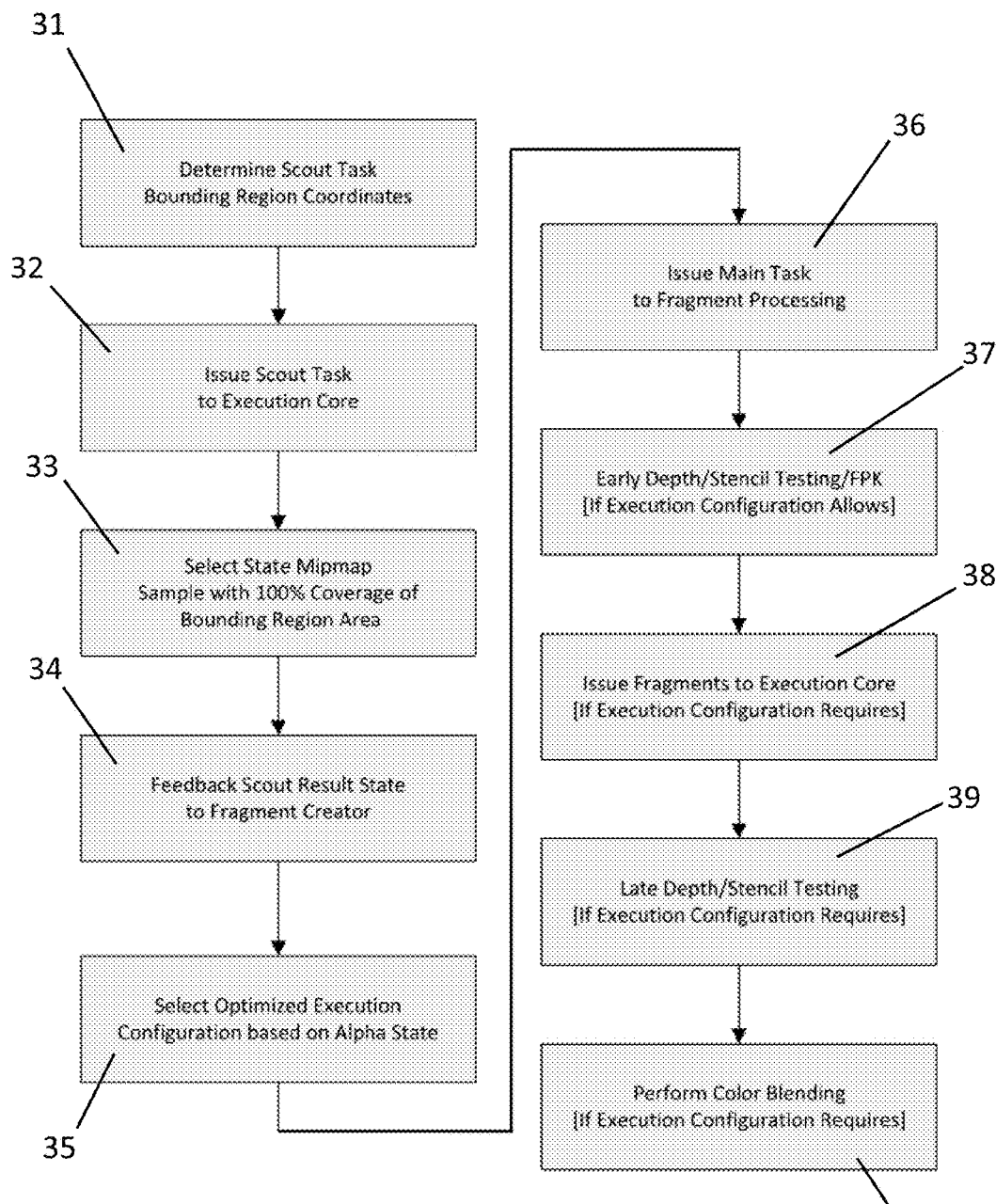
FIG. 4 shows a flow chart detailing the operational steps of the graphics processing pipeline of FIG. 3.

When an object to be rendered that has a compressed representation of its alpha values associated with it is recognised, as shown in FIG. 4 one or more "scout" threads (tasks) are generated to sample the compressed representation of the alpha values for the object.

To do this, a bounding box to be used to sample the compressed alpha value representation for the object in question is first determined (step 31, FIG. 4). The bounds in screen space for the bounding box, e.g. based on a bounding box of the whole tile, or a logical AND of the tile and the object (with or without the application of early depth and stencil testing to remove redundant sampling points), may be produced by the GPU fragment front end.

The present embodiment is arranged to sample the compressed alpha value representation for a particular object for the set of sampling points (e.g. tile) in question as a whole, as this both reduces the amount of data sampled and also enables, depending on the alpha value sampled, a single decision as to further processing in relation to the object and set of sampling positions (e.g. tile) as a whole to be taken.

To achieve this, the bounding box for an object for this purpose is determined as shown in FIGS. 5a, 5b, 5c, 5d and 5e. FIG. 5a shows a region 41 of a render output, e.g. frame, being rendered, which is divided into six tiles 42 that are each to be rendered separately. Thus, in this case the set of sampling points being rendered will be for a respective tile 42.

Figure 5:
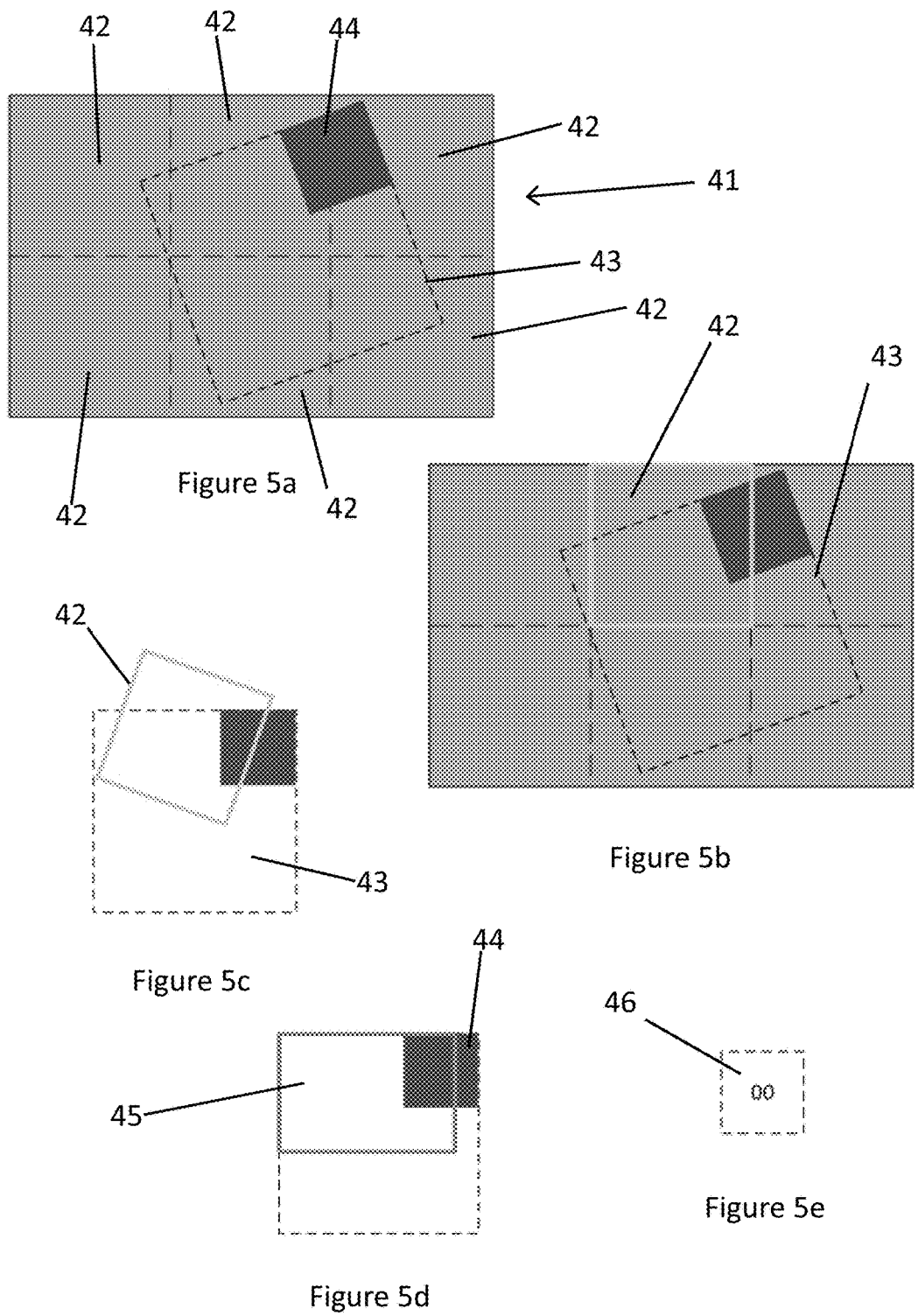
FIGS. 5*a*, 5*b*, 5*c*, 5*d* and 5*e* show an example of the sampling of a compressed representation in an embodiment of the technology described herein.

FIG. 5 shows an exemplary primitive 43 (e.g. similar to the quad primitive 1 in FIG. 1) to be rendered as part of the render output that covers part of most of the tiles 42. Most of the area of the primitive 43 is transparent, apart from a rectangular area 44 in the corner of the primitive 43 which is opaque, i.e. only this part 44 of the primitive 43 could be visible in the final render output. As discussed with reference to FIGS. 2a and 2b for the quad primitive 1 shown in FIG. 1, the primitive 43 has associated with it a texture detailing the transparency (alpha) information for the primitive 43, and a set of compressed representations of that transparency information.

In this example, the sides of the primitive 43 are not aligned with the sides of the tiles 42 (as shown in FIG. 5b in the frame of the tile 42, and in FIG. 5c in the frame of the primitive 43 (and thus of the texture and its compressed representation)). Thus to sample the texture associated with the primitive 43 for a particular tile 42 would require a complex mapping from the tile 42 into the texture (because the tile would need to be rotated and then cropped, transforming it into an irregular quadrilateral).

To address this, in this embodiment of the technology described herein, a bounding box 45 in the frame of the primitive 43 (and thus of the texture associated with the primitive 43 and its compressed representation), which surrounds the tile 42, is determined as shown in FIG. 5d. This bounding box 45 is then used to sample the compressed representation of the alpha values for the object (primitive) 43.

Other arrangements would, of course, be possible.

Once the bounding box has been determined (step 31, FIG. 4), a "scout task" ("scout" thread(s)) to sample the compressed representation of the alpha values for the object (primitive) is created and issued to the execution core 26 by the fragment thread creator 25 (step 32, FIG. 4). In response to this, the execution core 26 executes fragment processing that samples the compressed alpha value representation using the bounding box (step 33, FIG. 4).

To sample the compressed alpha value representation, the resolution level of the alpha value mip-map which covers the bounding box with a single alpha value is selected, and then sampled using the bounding box (step 33, FIG. 4). This selection is performed by hardware in the graphics processing pipeline which is responsible for converting the bounds of the bounding box in screen space into the selection of the mip-map level, e.g. to determine which single mip-map level covers the whole area of the bounding box. Alternatively this could be performed by a shader which calculates the texture position to sample, but this may be less efficient.

For the bounding box 45 shown in FIG. 5d, as this covers an area of the primitive 43 which is transparent and an area 44 which is opaque, the transparency (alpha) value sampled from the compressed alpha values representation will be "00" 46 (a complex transparency value), i.e. as shown in FIG. 5e. (If a "complex transparency" (indicator) value has been returned, the compressed representation may be sampled again at a finer resolution, e.g. at the next level of the mip-map, to determine the transparency (alpha) value in more detail for sub-regions of the tile, when desired.

The result of the "scout" thread, i.e. the sampled transparency (alpha) value for the object in question (e.g. the primitive 43) for the set of sampling points (e.g. tile) in question, is returned by the fragment thread retire stage 27 via the feedback loop 28 to the fragment setup stage 23 (step 34, FIG. 4).

The fragment setup stage 23 then uses the sampled transparency (alpha) value for the object to determine how the fragments for the object should be processed for the set of sampling points (e.g. tile) in question.

For example, when the sampled alpha value for the object shows that the object is either fully transparent or fully opaque for the set of sampling points (e.g. for the part of the tile that the object falls within (covers)) in question, then the blending stage of the graphics processing pipeline can be configured, e.g. to simplify (or even disable) the blending operation for fragments for the object accordingly.

If the object is determined from the compressed representation of its alpha values to be fully transparent for the set of sampling points (e.g. for the part of the tile that the object falls within (covers)) in question (i.e. the alpha value sampled from the compressed representation has a value of "01"), then it can be determined that no further processing of the object in relation to the set of sampling points in question is required (because the object will not affect the final render output).

If the object in question is determined to be fully opaque for the set of sampling positions (e.g. for the part of the tile that the object falls within (covers)) in question, then the fragments for the object for the set of sampling positions in question can be set to undergo early, rather than late, depth testing and depth updating. In this case, the early depth testing stage may also be configured to enable the culling process described in the Applicant's GB-A-2511177 which "kills" fragments and/or sampling points that are already being processed in a graphics processing pipeline when a later opaque fragment passes the early depth test.

The operation in the manner of the technology described herein can thus identify opportunities to allow depth testing, etc., to be moved from a late depth testing stage of the graphics processing pipeline to an early depth testing stage of the graphics processing pipeline.

On the other hand, when the object, or a region thereof, is determined to be neither fully transparent or fully opaque (i.e. translucent or a mixture of regions that are two or more of fully transparent, fully opaque and translucent), then it can be determined that early depth testing may be ineffective or inappropriate for the object, and so early depth testing for the object could be disabled (and late depth testing, etc., enabled).

It would also be possible to, for example, modify or even omit certain fragment shading operations in the execution core 26 based on the determined alpha values. For example, some applications use simple shaders which perform an alpha test per fragment to determine if the fragment is to be discarded or not. When a fragment is not discarded, then it sets the depth buffer, but generates no colour output. When the sampled compressed representation of the alpha values can detect that a patch of fragments for an object will all be above the alpha threshold, then this could be identified as an opportunity to do an early depth buffer update, without the need to execute the shader that performs the alpha test.

In other (e.g. more complex) cases, it could be possible to use the determined alpha value(s) to select which shader routine the execution core is to execute for the fragments for the object being processed (e.g. from one of a number of different shader variants that are each, e.g., optimised for particular alpha value states of an object being rendered).

The fragment setup stage 23 thus uses the sampled transparency (alpha) value for the object to determine how the fragments for the object should be processed for the set of sampling points (e.g. for the part of the tile that the object falls within (covers)) in question, and in particular to determine, e.g., whether to enable or disable some or all of the processing of a given processing stage or stages for the object, to choose between a number of variants for the processing of fragments for the object by a given processing stage or stages, etc.

Once the relevant processing (execution) configuration for the object in question has been determined based on the sampled alpha value, the fragments for the "normal" processing of the object in question (the "main task" in FIG. 4) for the set of sampling points (e.g. for the part of the tile that the object falls within (covers)) in question are issued by the fragment setup stage 23 to the remainder of the graphics processing pipeline (step 36, FIG. 4). The fragments have the determined, selected processing configuration associated with them, e.g. by virtue of their render state, and/or by having a particular shader or shaders associated with them.

As shown in FIG. 4, these fragments for the "normal" processing task for the object in question will be processed by the various stages of the graphics processing pipeline in their associated processing (execution) configuration.

Thus, as shown in FIG. 4, the fragments will firstly be subjected to an early depth/stencil test when the execution configuration based on the sampled alpha value indicates that that should be done (and in this case the culling process described in the Applicant's GB-A-2511177 which "kills" fragments and/or sampling points that are already being processed in a graphics processing pipeline is also enabled). Otherwise, this processing will be skipped.

Then the fragment thread creator 25 will create fragment threads and issue those fragment threads to the execution core 26 to process the fragments when the execution configuration based on the sampled alpha value indicates that that should be done (step 38, FIG. 4). In this case, the shader that the execution core 26 executes for each fragment thread may be selected based on the sampled alpha value(s). Again, this step may be omitted when it is determined from the sampled alpha value(s) that the issue of fragment threads to the execution core is not required.

The issued fragments may then undergo late depth/stencil testing when the execution configuration based on the sampled alpha value requires that to be done (step 39, FIG. 4).

Finally, any colour blending indicated by the determined execution configuration based on the alpha value will be performed (step 40, FIG. 4).

The resulting processed fragment output may then be output as desired, e.g. to a tile buffer and thence to a frame buffer, for use.

An alternative embodiment of the technology described herein will now be described with reference to the graphics processing pipeline 51 shown, schematically, in FIG. 6.

Figure 6:
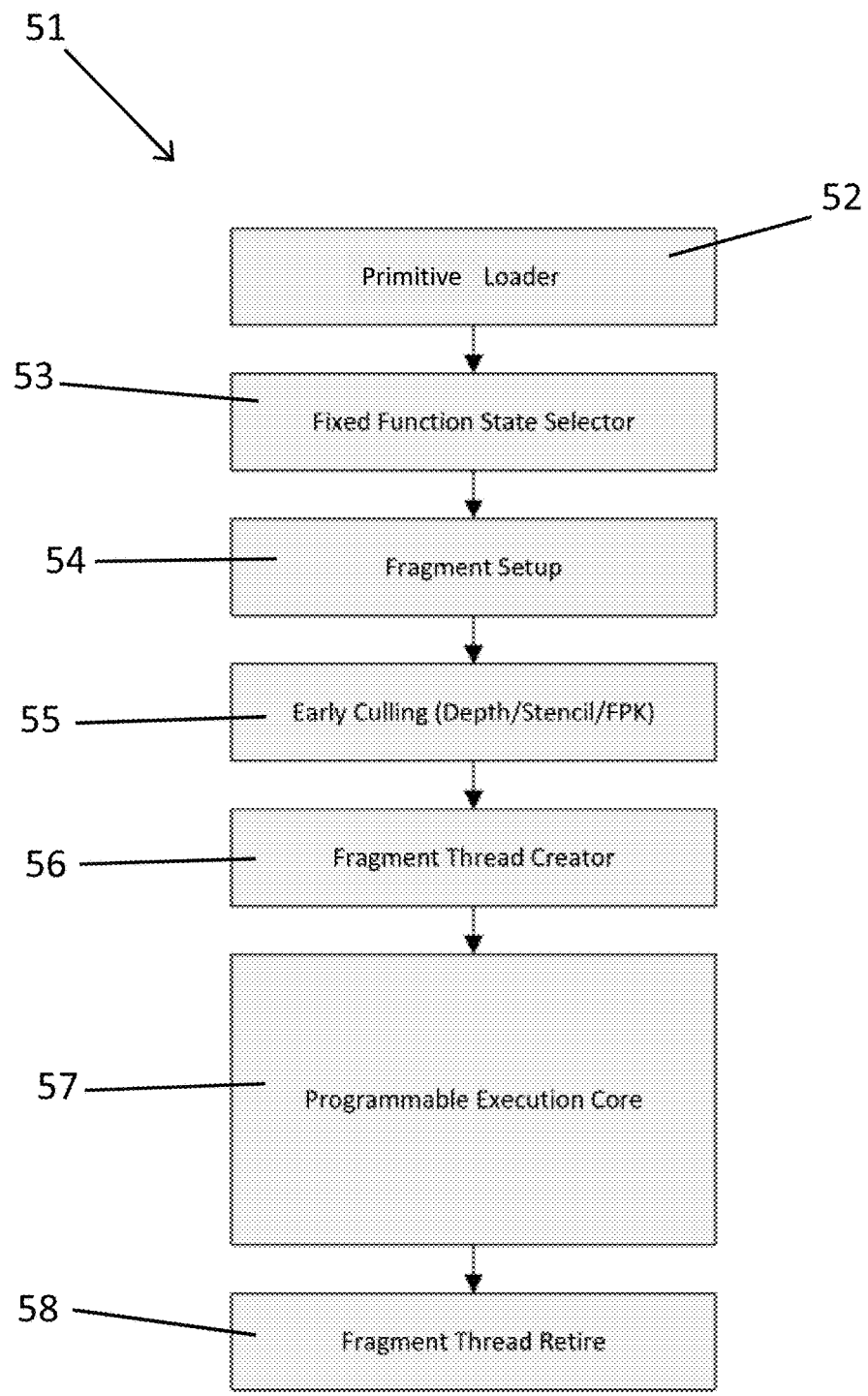
FIG. 6 shows a schematic of a graphics processing pipeline in a further embodiment of the technology described herein.

The graphics processing pipeline 51 shown in FIG. 6 is similar to the graphics processing pipeline 21 shown in FIG. 3. However, after the primitive loader 52, and instead of the fragment thread creator 56 generating "scout" threads as in the embodiment of FIG. 3 to sample the compressed representation of the alpha values, the graphics processing pipeline 51 of FIG. 6 comprises a fixed function "state selector" unit 53 that samples the compressed alpha value representations and determines the processing to perform on the fragments to be rendered based on the determined alpha value (transparency) information.

Following the fixed function unit 53 are the same processing stages in the graphics processing pipeline 51 as for the pipeline shown in FIG. 3, i.e. the graphics processing pipeline 51 comprises a fragment setup stage 54 which rasterises primitives into graphics fragments for rendering, an early culling stage 55 which is able to discard fragments which will not contribute to the final render output, a fragment thread creator 56 which generates processing threads corresponding to fragments to be processed, a programmable execution core 57 to process the fragment processing threads, and a fragment thread retire stage 58 which handles the output of the fragment threads when their processing completes.

The operation of the graphics processing pipeline 51 shown in FIG. 6 is similar to the operation described above of the graphics processing pipeline 21 shown in FIG. 3, i.e. with reference to the flow chart shown in FIG. 4. However, instead of "scout" threads being issued and processed to sample the compressed alpha value representation for an object being rendered for a set of sampling points, the fixed function state selector 53 samples the compressed alpha value representation for an object for the set of sampling points (e.g. tile) to determine the transparency (alpha) value(s) for the object for the set of sampling points and then selects the processing tasks to perform for the object for the set of sampling points (e.g. for the part of the tile that the object falls within (covers)) based on the determined alpha value(s).

Following this, the fragments are generated appropriately by the fragment setup stage 54. Then early depth testing and the discarding of fragments is performed, when necessary, based on the determined transparency (alpha) values, by the early culling stage 55. For any remaining fragments, the fragment thread creator stage 56 generates fragment processing threads and the execution core 57 then processes those fragment threads. Finally, the processed fragments are output by the fragment thread retire stage 58, e.g. to a tile buffer for assembly into the final render output.

It can be seen from the above that in at least an embodiment, a compressed representation of attribute information for an object to be rendered can usefully be used to determine attribute information about the object, and, furthermore, that this can then usefully be used to control the processing in the graphics processing pipeline when generating a render output.

The compressed representation of the attribute information can thus be used to allow the generation of the render output to be performed more efficiently. Moreover, as a compressed representation of the attribute information is used, this can be done more efficiently, thereby, e.g., making it effective to do this in advance of, e.g., (and, e.g., to control) the reading and use of the "full" attribute information for the object in question.

Although the example embodiments described with reference to the drawings have been concerned with using transparency (alpha) values to control the processing of objects and sampling points by the graphics processing pipeline, any suitable and desired attribute information, from which a compressed representation may be generated, may be used to control the processing. For example, in addition to (or instead of) transparency (alpha) values, the attribute information may comprise one or more of: one or more colour components (e.g. red, green, blue), stencil information, lighting values, shadowing values, etc. This allows one or more of: depth and/or stencil testing, lighting and shadowing, colour processing, etc. to be controlled using information sampled from a compressed representation of this attribute information.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline, the method comprising:
    determining attribute information for an object to be rendered for a set of one or more sampling points from a compressed representation of original attribute information associated with the object, when the set of one or more sampling points is being processed by the graphics processing pipeline to generate a render output; and
    using the determined attribute information to control the processing of the set of one or more sampling points by the graphics processing pipeline when generating the render output;
    wherein the control of the processing of the set of one or more sampling points comprises, for a plurality of processing steps to be performed for the set of one or more sampling points:
        using the determined attribute information to do one or more, or all, of: selecting, omitting or disabling, enabling, choosing between a number of variants of, and modifying one or more of the plurality of processing steps to be performed for the set of one or more sampling points in the graphics processing pipeline when generating the render output, and/or
        using the determined attribute information to do one or more, or all, of: only processing a subset of the sampling points in the set of sampling points, increasing the number of sampling points in the set of sampling points, and terminating the processing of one or more of the sampling points in the set of sampling points for the plurality of processing steps to be performed for the set of one or more sampling points in the graphics processing pipeline when generating the render output.

2. A method as claimed in claim 1, wherein the determining of the attribute information for the object from the compressed representation comprises issuing scout tasks to the graphics processing pipeline that are operable to sample the compressed representation to determine the attribute information.

3. A method as claimed in claim 1, wherein the attribute information for the object is determined in advance or in parallel with other processing for the set of sampling points.

4. A method as claimed in claim 1, wherein the attribute information is stored as a texture that is to be used for the object.

5. A method as claimed in claim 1, wherein the compressed representation comprises a compressed representation of transparency values for the object.

6. A method as claimed in claim 1, wherein the compressed representation represents the attribute information in question at a lower precision than the original attribute information.

7. A method as claimed in claim 1, wherein the compressed representation represents the attribute information with fewer pieces of data than in the original attribute information.

8. A method as claimed in claim 1, wherein the compressed representation of the attribute information comprises a set of two or more compressed representations of the attribute information, each storing and representing the attribute information at a lower resolution than the original attribute information.

9. A method as claimed in claim 1, further comprising generating a compressed representation of attribute information associated with an object to be rendered; and storing the compressed representation along with the original attribute information for use in generating a render output by a graphics processing pipeline when rendering the object.

10. A graphics processing pipeline comprising:
 processing circuitry capable of:
  determining attribute information for an object to be rendered for a set of one or more sampling points from a compressed representation of original attribute information associated with the object, when the set of one or more sampling points is being processed by the graphics processing pipeline to generate a render output; and
  using the determined attribute information to control the processing of the set of one or more sampling points by the graphics processing pipeline when generating the render output;
  wherein the control of the processing of the set of one or more sampling points comprises, for a plurality of processing steps to be performed for the set of one or more sampling points:
   using the determined attribute information to do one or more, or all, of: selecting, omitting or disabling, enabling, choosing between a number of variants of, and modifying one or more of the plurality of processing steps to be performed for the set of one or more sampling points in the graphics processing pipeline when generating the render output, and/or
   using the determined attribute information to do one or more, or all, of: only processing a subset of the sampling points in the set of sampling points, increasing the number of sampling points in the set of sampling points, and terminating the processing of one or more of the sampling points in the set of sampling points for the plurality of processing steps to be performed for the set of one or more sampling points in the graphics processing pipeline when generating the render output.

11. A graphics processing pipeline as claimed in claim 10, wherein the processing circuitry is capable of issuing scout tasks to the graphics processing pipeline that are operable to sample the compressed representation to determine the attribute information for the object from the compressed representation.

12. A graphics processing pipeline as claimed in claim 10, wherein the processing circuitry is capable of determining the attribute information for the object in advance or in parallel with other processing for the set of sampling points.

13. A graphics processing pipeline as claimed in claim 10, wherein the attribute information is stored as a texture that is to be used for the object.

14. A graphics processing pipeline as claimed in claim 10, wherein the compressed representation comprises a compressed representation of transparency values for the object.

15. A graphics processing pipeline as claimed in claim 10, wherein the compressed representation represents the attribute information in question at a lower precision than the original attribute information.

16. A graphics processing pipeline as claimed in claim 10, wherein the compressed representation represents the attribute information with fewer pieces of data than in the original attribute information.

17. A graphics processing pipeline as claimed in claim 10, wherein the compressed representation of the attribute information comprises a set of two or more compressed representations of the attribute information, each storing and representing the attribute information at a lower resolution than the original attribute information.

18. A graphics processing pipeline as claimed in claim 10, wherein the processing circuitry is capable of: generating a compressed representation of attribute information associated with an object to be rendered; and storing the compressed representation along with the original attribute information for use in generating a render output by a graphics processing pipeline when rendering the object.

19. A non-transitory computer readable storage medium storing computer software code which when executing on a processor performs a method comprising:
 determining attribute information for an object to be rendered for a set of one or more sampling points from a compressed representation of attribute information associated with the object, when the set of one or more sampling points is being processed by the graphics processing pipeline to generate a render output; and
 using the determined attribute information to control the processing of the set of one or more sampling points by the graphics processing pipeline when generating the render output;
 wherein the control of the processing of the set of one or more sampling points comprises, for a plurality of processing steps to be performed for the set of one or more sampling points:
  using the determined attribute information to do one or more, or all, of: selecting, omitting or disabling, enabling, choosing between a number of variants of, and modifying one or more of the plurality of processing steps to be performed for the set of one or more sampling points in the graphics processing pipeline when generating the render output, and/or using the determined attribute information to do one or more, or all, of: only processing a subset of the sampling points in the set of sampling points, increasing the number of sampling points in the set of sampling points, and terminating the processing of one or more of the sampling points in the set of sampling points for the plurality of processing steps to be performed for the set of one or more sampling points in the graphics processing pipeline when generating the render output.

* * * * *